(12) United States Patent
Mishra et al.

(10) Patent No.: US 11,100,426 B1
(45) Date of Patent: Aug. 24, 2021

(54) DISTRIBUTED MATRIX DECOMPOSITION USING GOSSIP

(71) Applicant: Amazon Technologies, Inc., Seattle, WA (US)

(72) Inventors: Bamdev Mishra, Karnataka (IN); Mukul Bhutani, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 900 days.

(21) Appl. No.: 15/866,315

(22) Filed: Jan. 9, 2018

Related U.S. Application Data

(60) Provisional application No. 62/582,892, filed on Nov. 7, 2017.

(51) Int. Cl.
| | |
|---|---|
| *G06Q 40/00* | (2012.01) |
| *G06F 16/31* | (2019.01) |
| *G06F 16/33* | (2019.01) |
| *G06F 17/12* | (2006.01) |
| *G06N 20/00* | (2019.01) |
| *G06Q 30/06* | (2012.01) |

(Continued)

(52) U.S. Cl.
CPC ............ *G06N 20/00* (2019.01); *G06F 17/16* (2013.01); *G06Q 30/0202* (2013.01); *G06Q 30/0631* (2013.01)

(58) Field of Classification Search
CPC .... G06N 20/00; G06F 17/16; G06Q 30/0202; G06Q 30/0631
USPC ........................................................ 706/1–62
See application file for complete search history.

(56) References Cited

U.S. PATENT DOCUMENTS

| 5,887,186 A | * | 3/1999 | Nakanishi | ............... G06F 17/12 712/28 |
| 10,417,302 B2 | * | 9/2019 | Takeshige | ............... G06F 17/12 |
| 10,909,150 B2 | * | 2/2021 | Chapman | .............. G06F 16/313 |

(Continued)

OTHER PUBLICATIONS

Leon Bottou, et al, "Optimatization Methods for Large-Scale Machine Learning", Technical report, arXiv preprint arXiv:1606.04838, 2016, pp. 1-95.

(Continued)

*Primary Examiner* — Brandon S Cole
(74) *Attorney, Agent, or Firm* — Robert C. Koweït; Kowert, Hood, Munyon, Rankin & Goetzel, P.C.

(57) ABSTRACT

Systems and methods are disclosed to implement a distributed matrix decomposition system using gossip. In embodiments, the matrix decomposition system employs a scalable, parallel, and decentralized approach to divide an input matrix into a grid blocks, and individually decompose the blocks into local decomposed matrices by communicating (gossiping) with a limited set of neighboring blocks. In embodiments, the decomposition may be implemented as an iterative process using Stochastic Gradient Descent, where the decomposed matrices are iteratively updated and kept in approximate agreement for neighboring blocks. The division of the input matrix allows the decomposition operation to be easily parallelized among nodes of a distributed computing system and scaled to suit the size of the input matrix. Moreover, the distributed approach eliminates the need for a central server, which in some systems may represent an operational bottle neck, a single point of failure, or a target for attacks.

20 Claims, 10 Drawing Sheets

(51) Int. Cl.
    *G06F 17/16*    (2006.01)
    *G06Q 30/02*    (2012.01)

(56) References Cited

U.S. PATENT DOCUMENTS

| | | | |
|---|---|---|---|
| 2006/0167784 A1* | 7/2006 | Hoffberg | G06Q 50/188 |
| | | | 705/37 |
| 2020/0362334 A1* | 11/2020 | Regev | C12Q 1/6869 |

OTHER PUBLICATIONS

Rainer Gemulla, et al., "Large-Scale Matrix Factorization with Distributed Stochastic Gradient Descent", In Proceedings of the 17th ACM SIGKDD International Conference on Knowledge Discovery and Data Mining, pp. 1-47.

Petros Drineas, et al, "Competitive Recommendation Systems", In 34th annual ACS symposium on Theory of Computing (STOC), 2002, pp. 1-9.

Qing Ling, et al., "Decentralized Low-Rank Matrix Completion", In IEEE International Conference on Acoustics, Speech and Singal Processing (ICASSP), 2012, pp. 1-4.

Yossi Azar, et al., "Spectral Analysis of Data", In 33rd Symposium of Theory of Computing (STOC), 2001, pp. 1-15.

\* cited by examiner

| 1 | 1 | 1 | 1 | 2 |
|---|---|---|---|---|
| 2 | 2 | 2 | 2 | 2 |
| 2 | 2 | 2 | 2 | 2 |
| 1 | 1 | 1 | 1 | 1 | relative frequency of block selection while calculating gradient for $d^U$
310

| 1 | 2 | 2 | 2 | 1 |
|---|---|---|---|---|
| 1 | 2 | 2 | 2 | 1 |
| 1 | 2 | 2 | 2 | 1 |
| 1 | 2 | 2 | 2 | 1 | relative frequency of block selection while calculating gradient for $d^W$
320

| 1 | 3 | 3 | 3 | 2 |
|---|---|---|---|---|
| 3 | 6 | 6 | 6 | 3 |
| 3 | 6 | 6 | 6 | 3 |
| 2 | 3 | 3 | 3 | 1 | relative frequency of block selection while calculating gradient for $f$
330

*FIG. 3*

DISTRIBUTED MATRIX DECOMPOSITION USING GOSSIP

BACKGROUND

Increasingly, companies are using machine learning systems to make predictions on data collected in different contexts. For example, large-scale transaction systems have become common in recent years. A company may implement a distributed system using web servers and application servers to conduct transactions for goods and services over the world wide web. Consumers may visit the company's web site to view and/or transact in goods and services offered by the company or third-party companies. The company may collect transaction data from its customers, and use machine learning to predict future transactions of the customers.

The technique of approximating or completing a matrix by decomposing it into two non-sparse low-rank matrices is used in solving many types of machine learning and data mining problems. For example, the decomposed low rank matrices can be used to predict unknown entries of the original matrix. However, current systems that are used to perform matrix decomposition operations still face a number of technical challenges. Decompositions of large matrices generally require large and expensive computer systems having substantial amounts of memory and computational capacities. In some cases, decompositions of very large matrices may not be feasible given the current computing architectures. Another issue that crops up in pragmatic settings is that of privacy and security. Often, the matrices contain data about users that can potentially be sensitive and thus storing it in one central location makes the data prone to attacks. Accordingly, improved architectures and methods for decomposing large matrices are generally needed.

BRIEF DESCRIPTION OF THE DRAWINGS

FIG. 3 illustrates the relative frequencies of block selection in calculating different types of gradients during a decomposition of an example matrix, according to some embodiments.

Figure 1:
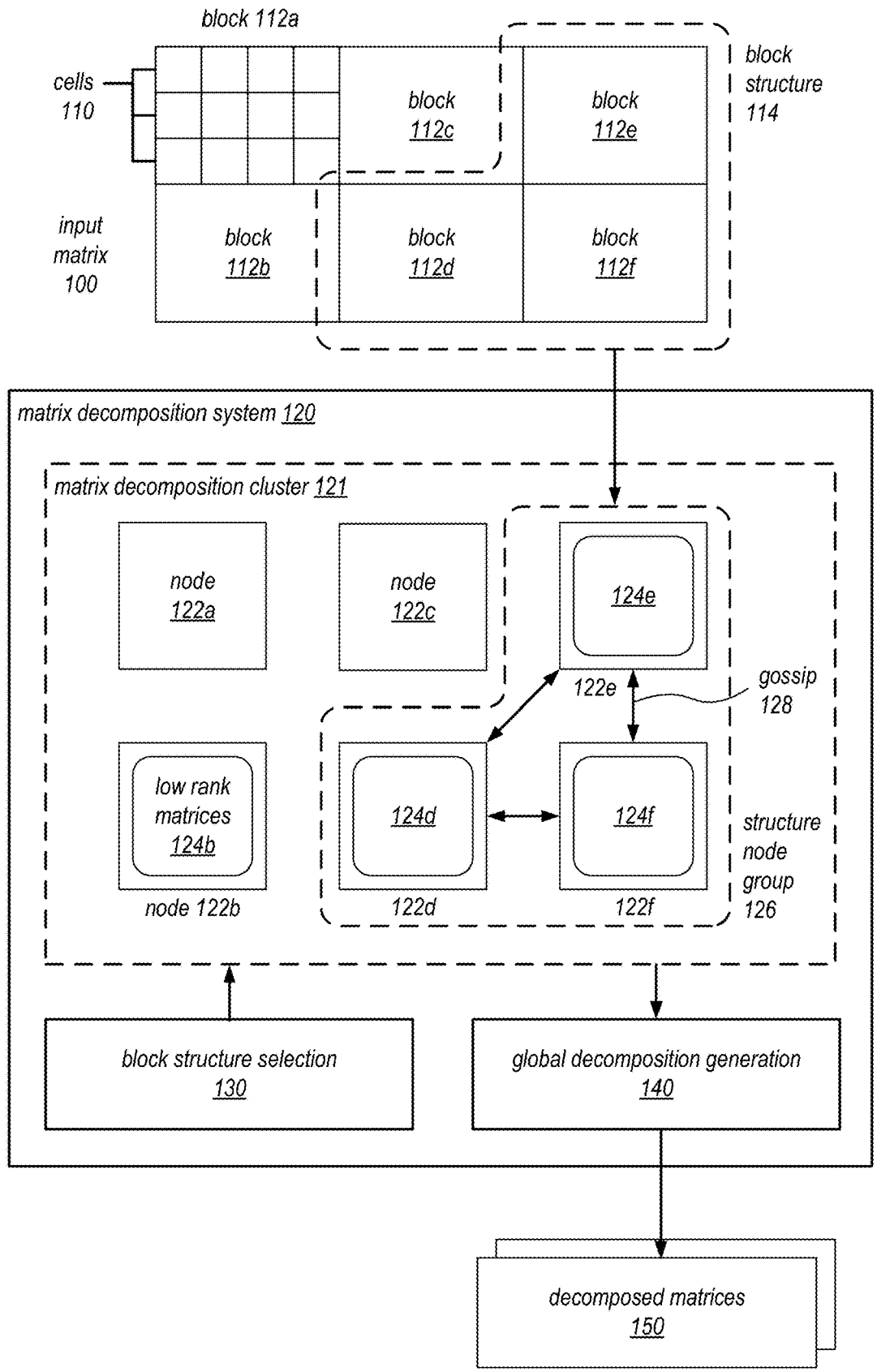
FIG. 1 is a diagram illustrating components and operations of a distributed matrix decomposition system using gossip, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a distributed matrix decomposition system using gossip. The disclosed system employs a scalable, parallel, and decentralized approach to divide an original matrix into a grid blocks, and individually decompose the blocks into local decomposed matrices by communicating (gossiping) with neighboring blocks. The techniques disclosed herein improves the functionality of current computer systems that perform matrix decompositions by allowing the decomposition to be easily parallelized among nodes of a distributed computing system and scaled to suit the size of the input matrix. The improved system also eliminates the need for a central server, which in various embodiments may represent an operational bottle neck, a single point of failure, or a singular target for attacks.

The technique of approximating a matrix by decomposing it into two or more low rank matrices is useful in solving many machine learning and data mining problems including for example recommendation systems, information retrieval via latent semantic indexing, algorithms for graph centrality, and clustering and learning mixtures of distribution, among other applications.

For example, the task of building a recommendation system involves taking a large, sparse matrix X of dimensions m×n and finding its low rank decomposition $X=UW^T$ where U and W are non-sparse matrices of dimensions m×r and n×r respectively. The product of these matrices can then be used to find the missing entries of X and hence fulfilling the recommendation system's use case. A commonly occurring example of a recommendation system is recommending movies to a set of users. In this example, each user represents a row of a large matrix X and the corresponding columns are their ratings of the available movies.

The example showcases the inherent challenges faced by the decomposition system. First, the ratings matrix (X) is a sparse matrix of very large dimensions. Decompositions of large matrices often demand large and expensive computer systems having substantial amounts of memory and computational capacities. In some cases, the process can be very time consuming. In some cases, decompositions of very large matrices may not be feasible given the current computing architectures. Another issue that often crops up in pragmatic settings is that of privacy and security. In many applications, the matrices contain with information about users which can potentially be sensitive. Storing such information in one central location makes it prone to attacks. For example, a single node that stores the complete information for a just single user may become a target for potential attacks or leaks.

Accordingly, in some embodiments of the matrix decomposition system disclosed herein, the system may divide the original matrix into a grid of blocks, and collect different groups of adjacent blocks into block structures. In some embodiments, localized decomposition operations may be performed on the blocks in a manner that keeps the decomposed or factored matrices for each block in the structure in relative consensus. In some embodiments, the decomposition of each block is performed by an individual computational unit, such as a node in a cluster, and nodes that work on blocks in the same structure group may engage in gossip to maintain consensus among their results. In some embodiments, the decomposition process may be performed as an iterative process using a stochastic gradient descent technique, using a cost function that measures both the error of the recomposed block and the divergence of results among neighboring blocks in the structure group. In some embodiments, the system may iteratively perform local decompositions on randomly selected block structures until convergence is reached. In some embodiments, the process may then combine the local decomposed matrices or factored for each block to obtain the global decomposed or factored matrices for the entire matrix.

As may be appreciated by those skill in the art, embodiments of such a system improves the functionality of current computing system that perform matrix decompositions, achieving a number of technical benefits. For example, in embodiments, the disclosed system allows the decomposition process to be easily parallelized among different nodes of a distributed computing system. Such parallelization improves system performance and reduces resource contention within the system. The division of labor also allows the system to scalable according to the size of the matrix or the number of latent parameters. In embodiments, the gossip communication that occur during decomposition are limited to only nodes or blocks within a particular block structure. Thus, network or inter-process communication during the process is kept relatively low, further improving the performance of the system.

In addition, embodiments of the disclosed system divide the original matrix along two dimensions, and allow consensus to be built among the blocks in both dimensions separately. This division approach allows the matrix to be easily divided across a grid of compute nodes in a very natural manner, and neighbor selection to be performed based on physical adjacency. The decoupling of the two dimensions also aligns with the two resulting decomposed matrices that are produced as the result of each local decomposition, so that in some embodiments, the cost functions in the two dimensions may be implemented differently, depending on the needs of the system.

Embodiments of the improved system also eliminate the need for a central server, which in various embodiments may represent an operational bottle neck, a single point of failure, or a singular target for attacks. In some embodiments of the system, no single node will have the complete information about a complete row or a complete column in the matrix. This feature enhances security and data privacy where the original matrix or decomposed matrices represent confidential information. Again, because the data is not shared with a central server and gossip is limited to a small set of neighboring nodes, the system ensures that the risk of complete information theft is kept to a minimum.

In addition, as may be understood, in some embodiments, the decomposition results of any particular node in the system is also reflected to an extent in the results of its neighboring nodes. Thus, even if the results of a particular node are lost, the global decomposition matrices may still be computed from the results of other nodes, within some tolerance of error. The system thus implements a form of redundancy, allowing it to continue operating robustly in spite of occasional partial failures in the network. These and other features and benefits of the item metric prediction system are described in further detail below, in connection with the disclosed embodiments and the figures.

FIG. 1 is a diagram illustrating components and operations of a distributed matrix decomposition system using gossip, according to some embodiments. As shown, the system may operate to decompose an input matrix 100, which may be a sparse matrix, via a matrix decomposition system 120, into decomposed matrices 150. In some embodiments, the matrix decomposition system 120 may employ a matrix decomposition cluster 121 to produce local decomposition results for blocks in the matrix 100. As shown, the local results may then be provided to a global decomposition generation unit or module 140 to generate the decomposed matrices for the matrix 100.

As shown, in some embodiments, the matrix 100 may first be divided into a p×q dimensional rectangular grid of blocks (e.g., blocks 112*a-f*). Each of these smaller blocks 122 may be referred by using indices i and j corresponding to the row and column of the grid to which a block belongs. Thus, $X_{ij}$ refers to the block in ith row and jth column of the decomposed grid. In some embodiments, each block 112 may include a block of cells 110 in the matrix 100. In some embodiments, the blocks 112 may be divided based on the properties of the matrix decomposition cluster 121, for example the number, processing capabilities, or storage capacities of the nodes 122 in the cluster.

In some embodiments, the blocks 112 may be mapped to nodes 122 in the matrix decomposition cluster 121, so that each node is charged with determining the local decomposed matrices for its assigned block. In some embodiments, the assignment from block to node may dynamically change from iteration to iteration of the decomposition process. In some embodiments, the number of blocks 112 in the matrix 100 may be equal to the number of nodes 122 in the cluster 121. In other embodiments, the number of blocks 112 may be greater than or less than the number of nodes 122.

In some embodiments, each block $X_{ij}$ can be factored as decomposed matrices $U_{ij}W^T_{ij}$ based on a matrix decomposition technique, such as Singular-Value Decomposition (SVD). During decomposition, the nodes attempt to learn the Us and Ws corresponding to each of these blocks and then in the end, combine them appropriately to form universal U and W via for example the global decomposition generator 140. The decomposed matrices 150 can then be used to find the missing entries of the original matrix X, in some embodiments.

In some embodiments, the matrix decomposition cluster 121 may be implemented using a plurality of nodes (e.g., nodes 122*a-f*). The nodes 122 may be implemented as separate physical computing devices, processors, or processor cores. In some embodiments, the nodes 122 may be implemented as separately executing processes, threads, or tenants in a multi-tenant execution container. In some embodiments, the nodes 122 may be implemented via separate virtual machine instances hosted on one or more virtualization hosts. In some embodiments, the nodes 122 may communicate via a network such as a cluster interconnect. In some embodiments, nodes 122 may communicate with each other via software protocols such as an inter-process communication protocol.

In some embodiments, as shown, each node 122 may store a set of low rank matrices 124 that represent the decomposed matrices determined as a result of the local decomposition operations. For example, as shown, node 122*b* may store low rank matrices 124*b*, node 122*d* may store low rank matrices 124*d*, etc. In the figure, elements labeled 122 refer to the nodes, and elements labeled 124 refer to the low rank matrices stored at the respective nodes.

As shown, in some embodiments, a number of blocks in the matrix (e.g., blocks 112*d*, 112*e*, and 112*f*) may form a block structure 114. The block structure 114 may represent a group of adjacent blocks that, for a given iteration of the decomposition process, are updated as a unit. That is, at a given iteration, the decomposed matrices 124 for a block will be influenced by the results of other blocks in the same structure group 114.

During a local decomposition operation, the individual nodes may form a structure node group 126, which may cooperate to decompose blocks belong to the node structure group 114. For example, as shown, nodes 122*d*, 122*e*, and 122*f* may gossip 128 with each other regarding their respective results (i.e., the low rank matrices 124*d*, 124*e*, and 124*f*). These individual nodes 122 may gossip with their neighbors and try to reach a consensus for the values of their Us and Ws. In some embodiments, each row of nodes in the structure tries to reach to a consensus in terms of U and each column of nodes in the structure tries to reach a consensus for W. The local decomposition is repeated in iterations until convergence is reached. In some embodiments, convergence may occur when changes in the values of Us and Ws converge within a specified range. At that point, in some embodiments, all of decomposed matrices Us and Ws may be appended together, for example via the global decomposition generator 140, to from the universal U and W which represents factors of original matrix X. In some embodiments, the global decomposition generator 140 may perform an averaging of the Us and Ws to obtain the universal or global U and W.

In some embodiments, the gossip pattern may be implemented so that during the learning phase, the blocks gossip only with their neighbors in the structure node group 126. Two blocks are neighbors if they share an edge with each other as shown in the figure. Depending on the embodiment, a block may have anywhere between 2 to 4 neighbors. For example, a block may have four neighbors (if the block does not belong to the first and last row/column), three neighbors (if the block is a non-corner block belonging to the first or last column/row), or two neighbors (if the block is one of the four corner blocks).

Figure 2B:
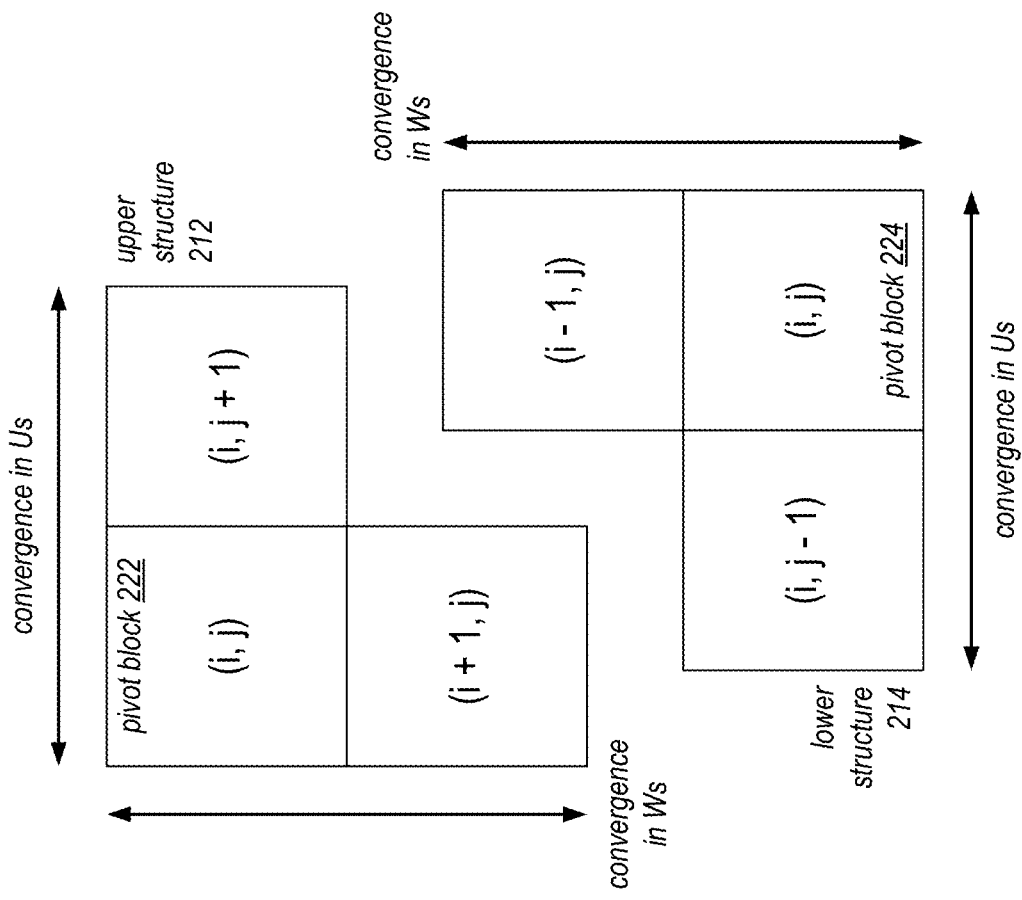
FIGS. 2A and 2B illustrate the use of block structures in distributed matrix decomposition system using gossip, according to some embodiments.
Figure 2A:
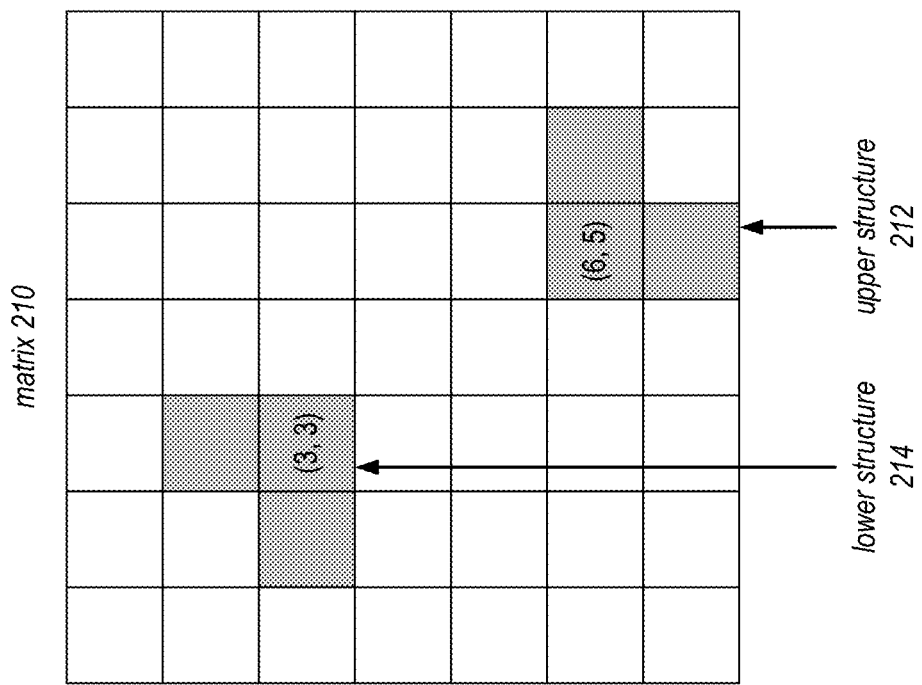

In some embodiments, two different types of structures 114 may be employed. FIGS. 2A and 2B illustrate the use of block structures in distributed matrix decomposition system using gossip, according to some embodiments. For example, as shown in FIG. 2A, a structure may be either an upper structure ($S^{upper}$) 212 or a lower structure ($S^{lower}$)) 214. Each of these potentially overlapping structures comprises of three neighboring blocks which gossip among themselves. In these structures, the connecting block that is adjacent to the other two blocks may be referred to as the pivot block (e.g., blocks 222 or 224). This block may be referred to as (i, j) and the two other blocks would be indexed relatively. This convention also helps in uniquely naming a structure. For example, if we denote a structure as $S_{ij}^{upper}$, it indicates that it is of the form $S^{upper}$ is pivoted at (i, j). Each block can belong to one or more than one structure depending on its position in the grid. Thus, taking a union of all the structures, it is possible to find all the neighboring blocks with which one specific block can gossip with.

It can be seen that a matrix (e.g. matrix 210) that is divided into a grid of size M×N would have (p−1)(q−1) number $S^{upper}$ and $S^{lower}$ structures each. The division ensures that no block (or structure) contains the complete entries of any row or column. Each of these structures is an independent computational unit and any two non-overlapping structures can potentially be processed independently. Thus, the system 120 divides the input matrix 100 into a two-dimensional array of blocks and tries to learn the factors corresponding to each block, thereby highly increasing the aspect of potential parallelism and security.

In some embodiments, the iterative determination of the local factors for each block may be modeled as an optimization problem where one tries to minimize the distance between X and $UW^T$. The objective function the two-dimensional grid formulation can be derived by doing the analysis of the $S^{upper}$ and $S^{lower}$ structures. For $S^{upper}$, the top left block is termed as pivot block and hence the three blocks have indices accordingly as (i; j), (i; j+1) and (i+1; j). For blocks (i; j) and (i+1; j), the system works to bring convergence between their Ws. For the blocks (i; j) and (i; j+1) the system works to bring convergence to their Us. The cost of a structure (either in $S^{upper}$ or $S^{lower}$) may be defined to include two components: f and d. The f cost component of a block measures how close it is to the original matrix. For a block indexed at (i; j) it can be written as:

$$f_{ij} = \|X_{ij} - U_{ij}W_{ij}^T\|_F^2, \quad (1)$$

where $\|Z\|_F^2$ denotes the square of the Frobenius norm of Z. The d cost component measures the consensus between two adjacent Us (denoted as $d^U$) or Ws (denoted as $d^W$) and can be written as:

$$d_{ij}^U = \|U_{ij} - U_{ij+1}\|_F^2, \quad (2)$$

$$d_{ij}^U = \|U_{ij} - U_{i+1j}\|_F^2. \quad (3)$$

The total cost (g) for a structure may be expressed as:

$$g^{structure} = f_{(for\ all\ three\ blocks)} + \rho d^U + \rho d^w, \quad (4)$$

where ρ is a weight factor. Hence, the total cost for a $S^{upper}$ structure may be expressed as:

$$g_{ij}^{upper} = f_{ij} + f_{i+1j} + f_{ij+1} + \rho\|U_{ij} - U_{ij+1}\|_F^2 + \rho\|W_{ij} - W_{i+1j}\|_F^2. \quad (5)$$

For $S^{lower}$, the costs may be derived in similar fashion:

$$g_{ij}^{lower} = f_{ij} + f_{i-1j} + f_{ij-1} + \rho\|U_{ij} - U_{ij-1}\|_F^2 + \rho\|W_{ij} - W_{i-1j}\|_F^2. \quad (6)$$

For a decomposition of matrix X into p×q, the end goal is to minimize the sum of costs for all $S^{upper}$ and $S^{lower}$ structures possible, in other words:

$$_{U_{ij},W_{ij}}{}^{min}\Sigma_{i=1,j=1}^{p,q}g_{ij}^{upper}+g_{ij}^{lower} \quad (7)$$

where the cost for $g_{ij}^{upper}$ and $g_{ij}^{lower}$ can be seen from (5) and (6) respectively if a structure is valid or 0 otherwise. The above costs have the following properties:
1. The difference between the predictions and the actual input matrix is minimized, and
2. Convergence is reached in the neighboring Us (in the same row) and in neighboring Ws (in the same column.

Based on the foregoing cost formulations, it may be shown that a Stochastic Gradient Descent (SGD) process would converge if the parameters are bounded by a large constant. And equivalent way to express the same constraint would be to use the Lagrange equivalent form. Thus, the objective function (7) could be expressed as:

$$_{U_{ij},W_{ij}}{}^{min}\Sigma_{i=1,j=1}^{p,q}g_{ij}^{upper}+g_{ij}^{lower}+\lambda\|U_{ij}\|_F^2+\lambda\|W_{ij}\|_F^2 \quad (8)$$

where λ is a regularization parameter.

Accordingly, in some embodiments, a Stochastic Gradient Descent algorithm may be implemented to minimize the objective function in a secure and potentially highly parallel way. The basic online sequential algorithm uses SGD to find the optima. The objective function is as mentioned in (7). Again, the input matrix X of dimensions m×n is divided into a grid of p×q blocks. In some embodiments, p and q may be received as part of the input which would govern how the data is distributed across the nodes 122. The distribution may in turn depend upon factors such as the number of parallel units that are employed in the system 120. Each of the blocks 112 can be factored into corresponding local decomposed matrices Uij and Wij, where i ranges from 1 to p and j ranges from 1 to q. Note, these are not global factors of the input matrix X but only factors of each of the blocks Xij of the divided matrix X. Suppose the system 120 is configured to generate factors of rank r.

---
Basic Update Algorithm via SGD
--- input: blocks for matrix X, rank r
output: Us, Ws
initialize all Us and Ws
while convergence not reached do
    $S^{struct}$ = randomly select a valid structure from the blocks
    [Us, Ws] = updateThroughSGD(Xs, $S^{struct}$)
    check for convergence
end

---

In some embodiments, the Us and Ws may be initialized randomly. During the decomposition process, the system 120 may randomly or pseudo-randomly sample one or more structures out of the various possible ones in the matrix, calculate the gradient and update the corresponding three Us and Ws of the three blocks in that structure. The process of selecting the structure, calculating the gradient and updating the parameters may be repeated until convergence is reached. As may be understood, in each update iteration throughout the process, each node only needs to gossip with its neighbors in the structure group 126, and the communication remains local in nature.

As shown in FIG. 1, in some embodiments, the system 120 may implement a block structure selection subsystem or module 130 to select different block structures 114 in the matrix 100, from iteration to iteration of the SGD process. In some embodiments, the block structure selector 130 may be implemented as a separate computer from the cluster 121.

In some embodiments, the selector 130 may be implemented as one of the nodes 122 in the cluster 121. In some embodiments, the block structure selector 130 may determine the selection of the block structures 114 in a pseudo-random manner. In some embodiments, the block structure selector 130 may select the block structures 114 from the matrix 100 in a manner so that it maximizes the number of non-overlapping block structures in the matrix. In some embodiments, the selection may be performed a priori, where the block structures used for each iteration are pre-selected and stored in a schedule, and the SGD process occurs according to that schedule. In some embodiments, the selection may occur dynamically with each iteration of decomposition.

In some embodiments, the updateThroughSGC function seen in the above algorithm may calculate the gradient of the objective function (8) and update the Us and Ws corresponding to the three blocks belonging to the selected structure. Based on the chosen structure, whether it is $S^{upper}$ or $S^{lower}$, appropriate algorithm for update is called. The algorithm shown below illustrates operations that may be performed by updateThroughSGD for a $S^{upper}$ structure. An analogous procedure for updating $S^{lower}$ can be similarly derived.

---
SGD Update for Upper Structure
--- input: $X_{cell}$, $U_{cell}$, γt, λ, ρ, i, j
output: updated $U_{cell}$ and $W_{cell}$
/* For the $S^{upper}$ pivoted at (i, j), the algorithm updates blocks (i, j), (i, j + 1) and (i + 1, j). Note that for the sake of clarity, the normalization constants are not shown in the algorithm. */
/* For block (ij) */
$VF = 2(U_{ij}W_{ij}^T - X_{ij})$
$U^{temp}_{ij} = U_{ij} + \gamma_t(VFW_{ij} + \rho(U_{ij} - U_{ij+1}) + \lambda U_{ij})$
$W^{temp}_{ij} = W_{ij} + \gamma_t(VF^T U_{ij} + \rho(W_{ij} - W_{i+1j}) + \lambda W_{ij})$
/* For block (ij + 1) */
$VF = 2(U_{ij+1}W_{ij+1}^T - X_{ij+1})$
$U^{temp}_{ij+1} = U_{ij+1} + \gamma_t(VFW_{ij+1} + \rho(U_{ij+1} - U_{ij}) + \lambda U_{ij+1})$
$W^{temp}_{ij+1} = W_{ij+1} + \gamma_t(VF^T U_{ij+1} + \lambda W_{ij+1})$
/* For block (i + 1j) */
$VF = 2(U_{i+1j}W_{i+1j}^T - X_{i+1j})$
$U^{temp}_{i+1j} = U_{i+1j} + \gamma_t(VFW_{i+1j} + \lambda U_{i+1j})$
$W^{temp}_{i+1j} = W_{i+1j} + \gamma_t(VF^T U_{i+1j} + \rho(W_{i+1j} - W_{ij}) + \lambda W_{i+1j})$
/*Assigning the temporary variables to permanent */
$U_{ij} = U^{temp}_{ij}$
$U_{i+1j} = U^{temp}_{i+1j}$
$U_{ij+1} = U^{temp}_{ij+1}$
$W_{ij} = W^{temp}_{ij}$
$W_{i+1j} = W^{temp}_{i+1j}$
$W_{ij+1} = W^{temp}_{ij+1}$

---

In some embodiments, the step size for the Stochastic Gradient Descent for reaching the optima may be tuned as the process progresses. In some embodiments, the step size may be updated based on the following formula:

$$\gamma_t = \alpha/(1+(bt)), \quad (9)$$

where t is the number of iterations and a and b are scalars, as described in Léon Bottou, Frank E. Curtis, and Jorge Nocedal, "Optimization methods for large-scale machine learning," Technical report, arXiv preprint arXiv: 1606.04838, 2016.

In some embodiments, after the algorithm has converged, as a one-time step, all the Us and Ws are combined to form a global U and W, which may comprise the resulting decomposed matrices 150 of FIG. 1.

In some embodiments, the algorithm involves taking a structure in pseudo-randomly and then calculating the costs associated with each of the blocks contained in it. Due to the shape of the block structures, the number of structures that a given block may be a part of is different for various blocks in the matrix. For example, the blocks present in the first or last row/column are part of fewer structures and hence have lower probability of being selected randomly than other blocks.

In some embodiments, the system 120 may be configured so that all the blocks to have equal representation in the decomposition process. Thus, in some embodiments, a coefficient may be multiplied to each block to normalize the times the block may be selected for an update. The relative frequency of a block getting selected in given in FIG. 3 and thus the coefficient to be used may simply be the inverse of it, in some embodiments.

FIG. 3 illustrates the relative frequencies of block selection in calculating different types of gradients during a decomposition of an example matrix, according to some embodiments. Table 310 depicts a grid of blocks for a matrix that has been divided by a decomposition system, for example system 120. The table shows the relative number of times a block is selected while calculating the gradient of $d^U$. Table 320 shows relative number of times a block is selected while calculating the gradient of $e^W$. Table 330 shows the number of times a particular block is selected while calculating gradient for f. As may be seen, blocks on the edges and corners of the input matrix are selected less often by the selector 130, in some embodiments. Accordingly, in some embodiments, the selector 130 may employ these relative frequencies in its selection process, so as to normalize the representation of the boundary blocks in the decomposition process.

In some embodiments, the selection may allow selected block structures to wrap around the grid, so that, for example, a block structure may be composed of blocks on opposite edges of the grid. In such embodiments, the edges and corners of the grid may not constrain the selection of block structures. Thus, in some embodiments, the normalization coefficients are not needed.

Figure 4:
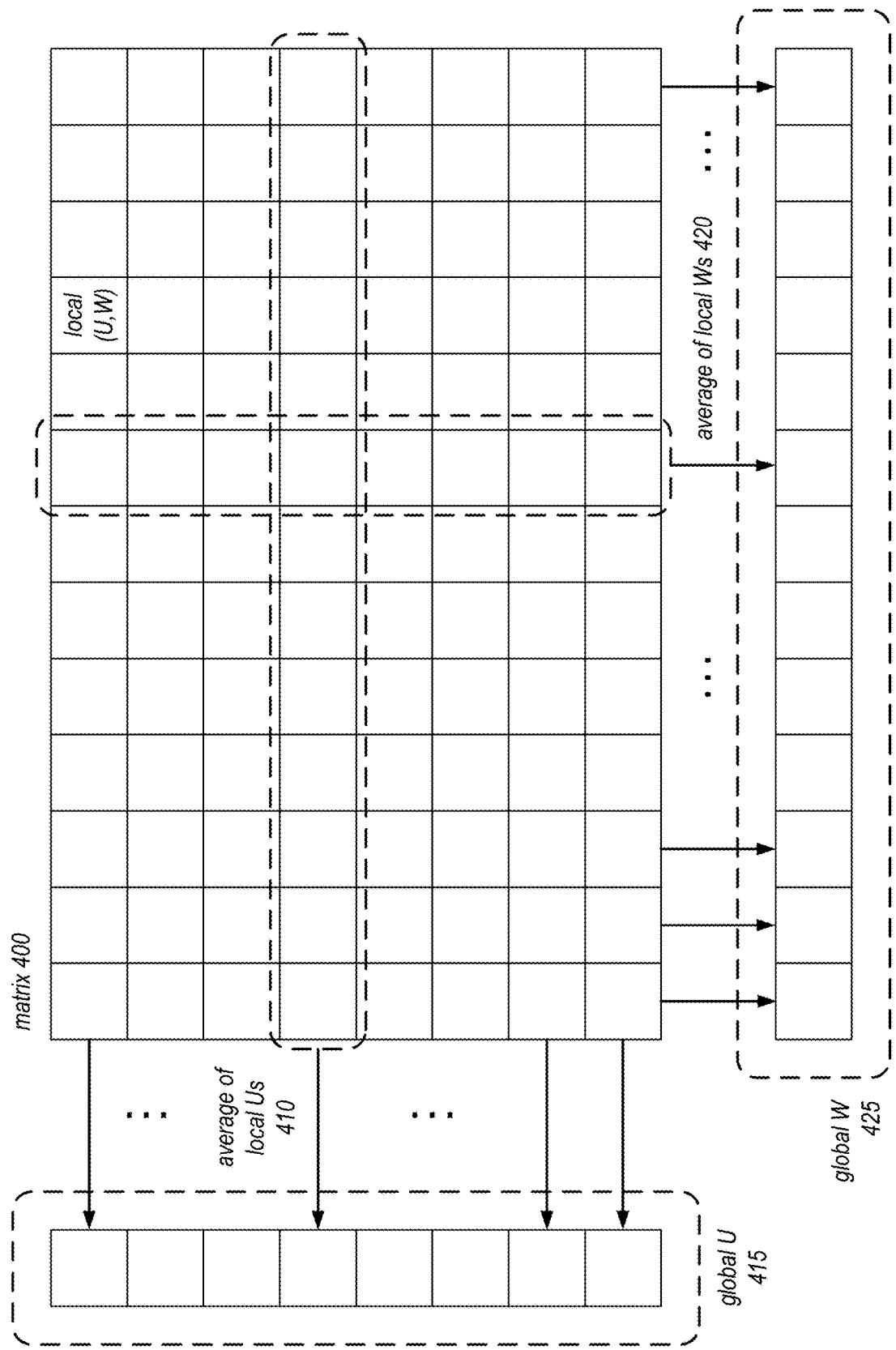
FIG. 4 is a diagram illustrating an example process of combining local decomposed matrices to produce globally decomposed matrices for a matrix, according to some embodiments.

FIG. 4 is a diagram illustrating an example process of combining local decomposed matrices to produce globally decomposed matrices for a matrix, according to some embodiments.

As shown, after the local decomposed matrices or factor matrices (e.g. matrices U and W) are determined for all blocks of a matrix (e.g. matrix 400), the local factor matrices may be combined to produce the overall factor matrices for the matrix. As shown, in this example, an average of one local factor matrix (e.g., the local U matrices) may be averaged across a row of the grid, as shown in operation 410. In some embodiments, this averaging may simply involve an arithmetic or geometric averaging of each value in the matrix, across all local matrices in that row. In other embodiments, other forms of averaging (e.g., a weighed averaging) may be used. In some embodiments, the averaging operation 410 may be performed for every row in the grid. In some embodiments, the resulting average matrices for every row may then be concatenated for form the global U 415, which may be used as the factor matrix U for the matrix 400.

Similarly, as shown, the local W matrices for a column of the grid may be averaged, in an averaging operation 420. As with the row averaging operation 410, the column averaging operating 420 may also be performed based on an arithmetic or geometric averaging of the values in the local matrices, or some other type of averaging technique. As shown, the average matrix produced from each column of the grid may then be combined or concatenated to generate a global W 425, which may be used as the factor matrix W for the matrix 400. In some embodiments, the global factor matrices U and W may be generated on the fly to be used for a particular task (for example a matrix completion operation). In some embodiments, the global factor matrices U and W may not be stored persistent in any central storage, so as to mitigate any security risks associated with centralized storage of such data.

The following discussion reports on empirical studies that had been performed using the embodiments of the matrix decomposition system. In particular, two sets of studies were performed to demonstrate the efficiency of the system. In the first set, the matrix decomposition system was run on synthetically generated data sets and calculate the cost as a slightly modified form of (8). For the second set of studies, an embodiment of the matrix decomposition system is used to on some popular datasets which are used widely used for performance benchmarks. The root mean squared error (RMSE) is used to gauge the performance of the system.

To solve the problem of matrix completion, a synthetic matrix subject is randomly generated to a rank constraint. Of this synthetic matrix, the majority of the elements are masked, thus generating the sparse training matrix. Similarly, a test matrix is also generated by choosing a fraction of elements in the original matrix which got masked and were not selected for generating the training matrix. The test matrix is used to evaluate and measure the cost. Since the end goal of matrix completion is to predict unknown entries, in these studies with synthetic datasets, a slightly modified version of cost described in (8) was used.

$$\Sigma_{i=1,j=1}^{P,q} f_{ij} + \lambda \|U_{ij}\|_F^2 + \lambda \|W_{ij}\|_F^2 \qquad (10)$$

This cost function is similar to (8) with the only difference being that the d cost is not included in the cost metric. Thus, in this embodiment, the cost is just used to establish convergence. However, the objective function being used is still (8) and thus the d cost still plays a role in calculation of the gradient. This ensures that the d cost also reduces and hence ensures that Us and Ws are indeed being learned.

In different studies, the following hyperparameters were used to tweak the system:
1. ρ: weight factor
2. λ: regularization parameter
3. p×q: the dimensions of the rectangular grid into which the input matrix X is divided into
4. a, b: the scalars in (9)
5. m×n: input matrix dimensions Table 1 describes various hyper parameters that were used for the studies, and Table 2 describe the value of the cost matrix as iterations increased.

TABLE 1

Parameters Used for Studies

| Param | Study #1 | Study #2 | Study #3 | Study #3 | Study #5 | Study #6 |
|---|---|---|---|---|---|---|
| ρ | 1e3 | 1e3 | 1e3 | 1e3 | 1e3 | 1e3 |
| λ | 1e−9 | 1e−9 | 1e−9 | 1e−9 | 1e−9 | 1e−9 |
| p × q | 4 × 4 | 4 × 5 | 5 × 5 | 6 × 6 | 5 × 5 | 5 × 5 |
| m × n | 500 × 500 | 500 × 500 | 500 × 500 | 500 × 500 | 5000 × 5000 | 10K × 10K |

TABLE 1-continued

Parameters Used for Studies

| Param | Study #1 | Study #2 | Study #3 | Study #3 | Study #5 | Study #6 |
|---|---|---|---|---|---|---|
| a | 5.0e−04 | 5.0e−04 | 5.0e−04 | 5.0e−04 | 5.0e−04 | 5.0e−04 |
| b | 5.0e−07 | 5.0e−07 | 5.0e−07 | 5.0e−07 | 5.0e−07 | 5.0e−07 |

TABLE 2

Empirical Results of Convergence in the Matrix Decomposition System

| # Iter | Study #1 | Study #2 | Study #3 | Study #3 | Study #5 | Study #6 |
|---|---|---|---|---|---|---|
| 0 | 1.45e+05 | 1.45e+05 | 1.45e+05 | 1.44e+05 | 6.42e+05 | 6.66e+07 |
| 40K | 3.04e+00 | 2.90e+01 | 8.99e+02 | 2.67e+04 | 1.55e+05 | 1.28e+07 |
| 80K | 6.92e−03 | 1.32e−01 | 1.45e+00 | 4.74e+02 | 1.26e+05 | 2.13e+04 |
| 120K | 3.02e−05 | 2.79e−03 | 8.10e−03 | 1.69e+01 | 1.92e+04 | 1.92e+02 |
| 160K | 9.62e−06 | 7.65e−05 | 1.44e−04 | 9.94e−01 | 2.83e+02 | 4.06e+00 |
| 200K | 9.54e−06 | 1.23e−05 | 1.90e−05 | 8.51e−02 | 6.03e+00 | 1.66e−01 |
| 240K | convergence | 1.07e−05 | 1.25e−05 | 1.04e−02 | 2.85e−01 | 9.96e−03 |
| 260K | | convergence | 1.21e−05 | 4.41e−03 | 7.39e−02 | 2.78e−03 |
| 280K | | | convergence | 1.96e−03 | 2.09e−02 | convergence |
| 300K | | | | 9.28e−04 | 6.44e−03 | |
| 400K | | | | convergence | convergence | |

Next, studies were performed to demonstrate the efficacy of the matrix decomposition system on widely used, high dimensional, and highly sparse public datasets which are frequently used for benchmarking. The input data is split in a 80 to 20 ratio. The training is done with the 80 percent portion. The 20 percent portion is kept for testing, to calculate and report the RMSE. All of the studies were performed with tuned parameters. Table 3 shows the RMSE that were observed for various datasets with different block division dimensions (p×q).

TABLE 3

Studies Using Real Datasets
Number of blocks p × q

| Rank | 2 × 2 | 3 × 3 | 4 × 4 | 5 × 5 | 10 × 10 |
|---|---|---|---|---|---|
| MovieLens 1 million | | | | | |
| 5 | 0.87 | 0.99 | 1.04 | 0.99 | 1.13 |
| 10 | 0.86 | 0.99 | 1.03 | 1.00 | 1.22 |
| 15 | 0.86 | 0.99 | 1.03 | 0.99 | 1.34 |
| MovieLens 10 million | | | | | |
| 5 | 0.97 | 0.95 | 0.98 | error | 1.07 |
| 10 | 0.97 | 0.95 | 1.00 | 0.99 | 1.25 |
| 15 | 0.98 | 0.96 | 1.03 | 1.02121 | 1.41 |
| MovieLens 20 million | | | | | |
| 5 | 0.95 | 0.92 | 0.93 | 0.99 | 1.01 |
| 10 | 0.96 | 0.93 | 0.93 | 1.02 | 1.11 |
| 15 | 0.96 | 0.94 | 0.93 | 1.05 | 1.24 |
| Netflix | | | | | |
| 5 | 1.03 | 0.98 | 1.13 | 1.06 | 1.02 |
| 10 | 1.00 | 0.98 | 1.14 | 1.02 | 1.02 |
| 15 | 1.00 | 1.11 | 1.16 | 1.02 | 1.03 |

As may be seen from the above results, embodiments of the matrix decomposition system is able to learn different Us and Ws corresponding to different blocks in the matrix and achieves convergence in all the cases. The order of reduction of the cost on synthetic datasets is 7 to 10 in all the cases. The studies on real datasets also provide sound evidence on learning. These studies confirm that that the matrix decomposition system is able to learn global factors even though the matrix is divided into many smaller and independent parts. The two-dimensional decomposition pattern may be used for keeping the communication local and the factors can be learned without communicating with a central server during the learning phase. The individual blocks in the matrix can thus be processed and stored on separate hardware and would need not need a central server to reach to consensus.

Figure 5:
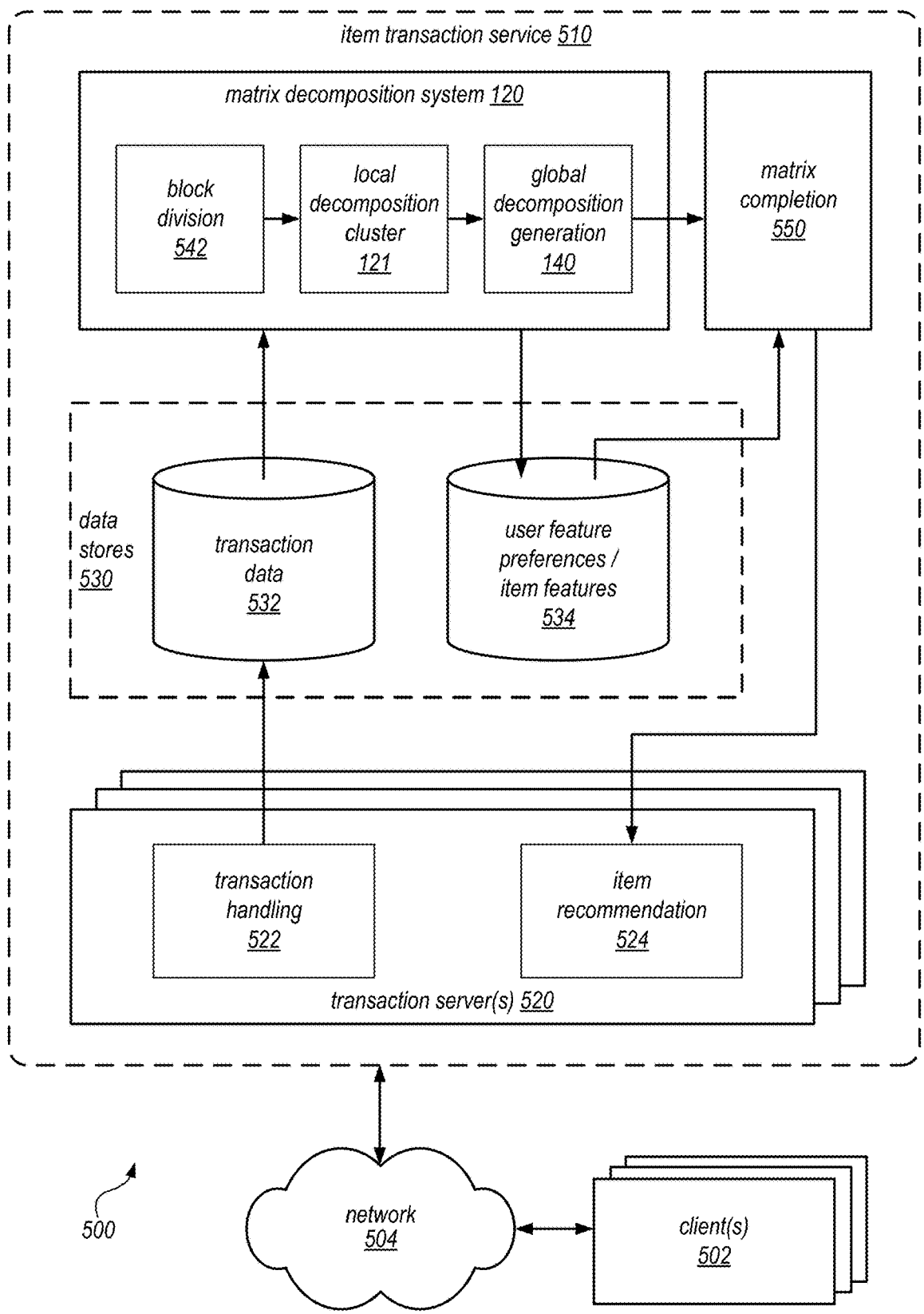
FIG. 5 is a diagram illustrating an example item transaction service that uses a distributed matrix decomposition system using gossip to make item recommendations, according to some embodiments.

FIG. 5 is a diagram illustrating an example item transaction service that uses a distributed matrix decomposition system using gossip to make item recommendations, according to some embodiments. The item transaction service 510 illustrated here represent only one application of the matrix decomposition system 120. Other applications may also make use of the matrix decomposition system described herein. In some embodiments, the matrix decomposition system may be implemented as a separate system outside of the item transaction service operating environment. In some embodiments, the matrix decomposition system may be implemented as a third-party service.

As shown, the item transaction service 510 may interact with one or more clients 502 associated with users of the item transaction service, and over the network 504. The clients 502 may encompass any type of client configurable to communicate with the item transaction service 510. For example, a given client 502 may include a suitable version of a web browser, or may include a plug-in module or other type of code module configured to execute as an extension to or within an execution environment provided by a web browser. Alternatively, a client 502 may encompass an application such as an application (or user interface thereof) that may make use of the computing resources of the item transaction service perform various operations (e.g., browse or purchase items). In some embodiments, such an application may include sufficient protocol support (e.g., for a suitable version of Hypertext Transfer Protocol (HTTP)) for generating and processing network-based service requests without necessarily implementing full browser support for all types of network-based data. In some embodiments, clients 502 may be configured to generate network-based service requests according to a Representational State Transfer (REST)-style network-based services architecture, a document- or message-based network-based services architecture, or another suitable network-based services architecture.

The clients 502 may communicate with the item transaction service 510 via network 504. In various embodiments, network 504 may encompass any suitable combination of networking hardware and protocols necessary to establish network-based communications between clients 502 and item transaction service 510. For example, a network 504 may generally encompass the various telecommunications networks and service providers that collectively implement the Internet. A network 504 may also include private networks such as local area networks (LANs) or wide area networks (WANs) as well as public or private wireless networks. For example, both a client 502 and the item transaction service 510 may be respectively provisioned within enterprises having their own internal networks. In such embodiments, the network 504 may include the hardware (e.g., modems, routers, switches, etc.) and software (e.g., protocol stacks, accounting software, firewall/security software, etc.) necessary to establish a networking link between the client 502 and the Internet as well as between the Internet and item transaction service 510. In some embodiments, clients 402 may communicate with item transaction service 510 using a private network rather than the public Internet.

Depending on the embodiment, the item transaction service 510 may be implemented in a variety of ways. For example, in some embodiments, the item transaction service 510 may be implemented using a group of web servers that presents a web interface to allow the clients 502 to browse or search for items, or make item transactions, via the web interface. In some embodiments, the item transaction service 510 may include a plurality of backend servers to process various tasks for the item transaction service 510. For example, in some embodiments, the item transaction service may include application servers that carry out various aspects of transactions, etc. As shown, the transaction handling functionality 522 may be handled by the transaction servers 520. In some embodiments, the internal servers of the item transaction service 510 may include other servers, such as servers to interface with third-party merchants, to manage inventory, to generate various reports, to allow for system administration, and, as shown, to manage user feature preference data and/or item feature data 534. This data may be derived based on collected transaction data 532, which may be provided in a sparse matrix with indicating users and item purchases. In some embodiments, the item transaction service 510 may be hosted as an application in a service provider network, which provides the hardware computing resources to support the programmed functionalities of the item transaction service. In some embodiments, the servers or nodes in the system such as the transaction servers 520 or the local decomposition cluster 121, and also resources such as data stores 530, may be provisioned by the service provider network to the item transaction service, which may be provisioned as virtual machine instances hosted on the physical machines of the service provider network. A person of skill in the art would understand that different item transaction services may be architected differently, and that the system architecture and functional components shown in the figure are merely illustrative.

As shown, the transaction servers 520 may include functional components such as transaction handling 522 and item recommendation 524. The transaction handling component 522 may be tasked with handling and completing transactions from users associated with clients 502. For example, the transaction handling component 522 may present successive web pages to the client 502 via the web interface, so as to allow the client to provide various information to complete the transaction. In some embodiments, the transaction handler component 522 may utilize payment subsystems to process user payment for a purchased item. In some embodiments, the transaction handling component may also interact with a fulfillment subsystem to initiate shipping of the item to the user. As shown, the transaction handler component 522 may record the transaction of users in one or more data stores 530.

As shown, the data stores 530 may store different types of data that are used by the item transaction service 510. For example, the data stores 530 may include data stores for transaction data 532, which may include details of each transaction performed by the users. In some embodiments, each transaction may be associated with a transaction user, a transaction item, the amount paid for the item, and other events associated with the transaction, such as shipment events, returns, etc.

In some embodiments, the data stores 530 may also include a data store for user feature preferences and/or item features 534, as shown. Such metadata information may be obtained from the matrix decomposition system 120, as discussed. For example, in some embodiments, metadata information may include observation of the actions or interactions of different persons (e.g. customers) with different items (e.g. products) on the item transaction service 510. For example, in some embodiments, the purchases or ratings of a set of users for a set of items may be compiled from the transaction data 532 into an input matrix. The matrix decomposition system 120 may then decompose the input matrix into a number of low rank decomposed or factor matrices. In some embodiments, the low rank decomposed matrices may include a matrix that indicates a user's feature preferences for a set of latent features that are learned from the input matrix. In some embodiments, the low rank matrices may include a matrix that indicates the latent features that of the different items. These low rank matrices may be received and store in a data store such as the data store 534, as shown. In some embodiments, as more transaction data 532 are generated in the item transaction service 510, the user feature preferences/item features data store 534 may be refreshed periodically in view of the new data. Thus, the matrix decomposition system 120 may execute on a periodic basis, to generate new decomposed matrices for the data store 534.

As shown, the matrix decomposition matrix may include components or modules such as a block division module 542, the local decomposition cluster 121, and the global decomposition generator 140. The block division module 542 may operate to divide a large input matrix into a grid of blocks, as discussed before. In some embodiments, the parameters of the division may be static. In some embodiments, the division may be based on the amount and capability of computing resources available to the matrix decomposition system 120 (e.g., the number of compute nodes in the cluster 121). In some embodiments, the manner of division maybe configurable, or even dynamically change based on runtime conditions (e.g., the size of the input matrix, the current bandwidth of the nodes in the cluster, etc.) The local decomposition cluster 121 and the global decomposition generator 140 may operate in similar fashion as discussed above.

In some embodiments, the item transaction service 510 may implement a matrix completion module 550. In some embodiments, the matrix completion module may be implemented on computing resources (e.g., a dedicated server) within the item transaction service 510. In some embodiments, the matrix completion module may be implemented outside of the operating environment or network of the item transaction service 510. In some embodiments, the matrix completion module 550 may be implemented within the matrix decomposition system 120.

In some embodiments, the matrix completion module 550 may complete matrices using the user feature preference and/or item features data stored in the data store 534. In some embodiments, as shown, the matrix completion module 550 may not rely on the data store 534, but instead obtain the factor matrices directly from the matrix decomposition system 120. In this manner, the factored matrices produced by the matrix decomposition system 120 are not stored in a single central location, thereby reducing any security risks associated with centralized storage. In some embodiments, the matrix completion module may use the factor matrices to complete user-to-item matrices, so as to predict potential user purchases or likely user ratings for a wide range of products. Such matrices may then be used to generate user purchase recommendations, or identify users that may be interested in particular items. As shown, these recommendations or results may be provided to different subsystems in the item transaction service 510, such as the item recommendation module 524.

In some embodiments, the item recommendation module 524 may generate a user interface or a communication to a user, which may present an advertisement or recommendation to the user for other products, based on the user's completed matrix determined from the user's past purchases or ratings. In some embodiments, the results of the matrix completion module 550 may be shown to different suppliers of items, to make recommendations on item pricing, features, and/or likely target customers. In some embodiments, the results of the matrix completion module 550 may be used to make future sales predictions for particular types of users, etc. Persons of skill in the art would understand that there are many applications of the matrix decomposition system 120 as described herein, and the discussions above regarding item recommendations and sales predictions are merely examples.

Figure 6:
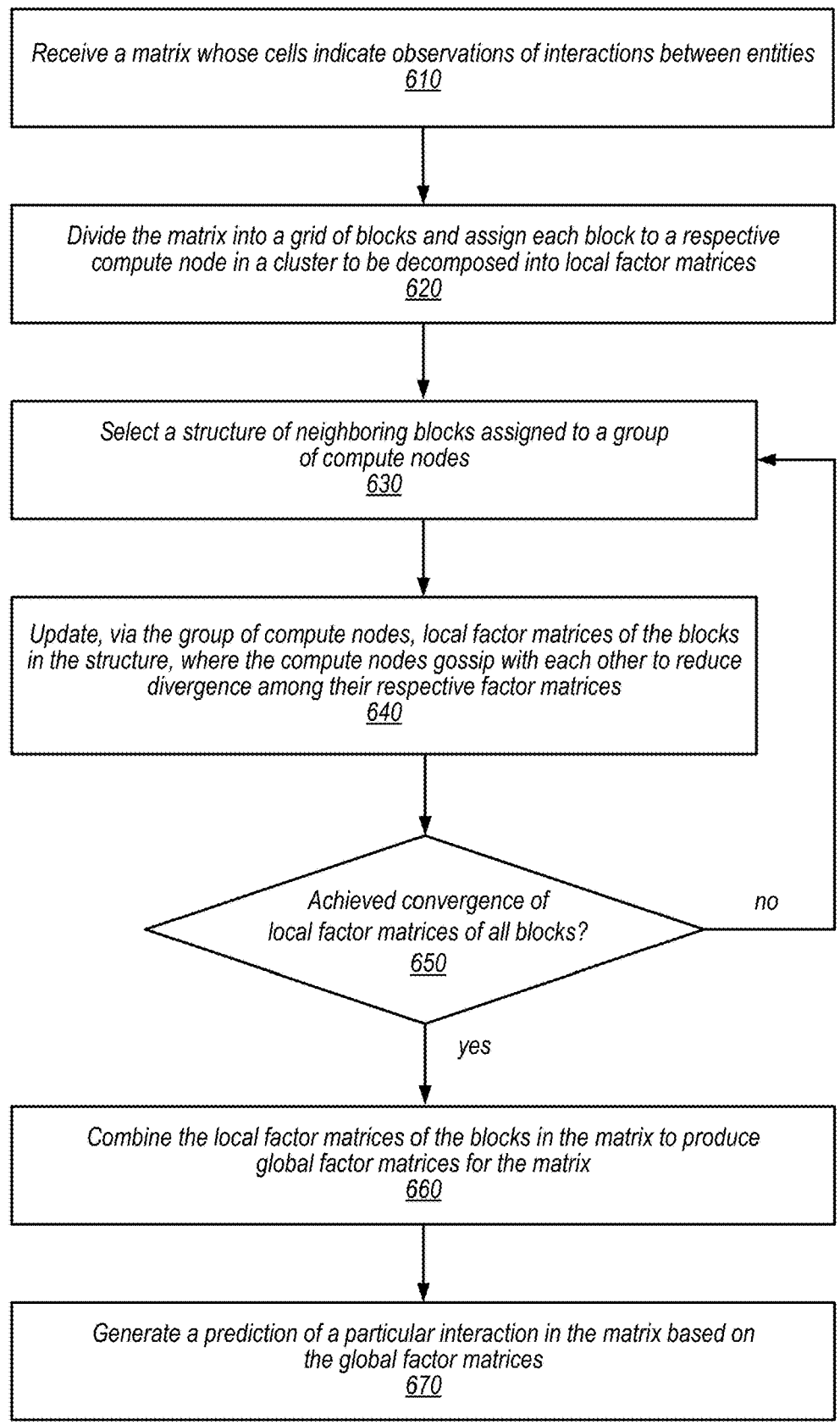
FIG. 6 is a flow chart diagram illustrating a process of a distributed matrix decomposition using gossip, according to some embodiments.

FIG. 6 is a flow chart diagram illustrating a process of a distributed matrix decomposition using gossip, according to some embodiments. The operations of FIG. 6 may be performed, for example, by the matrix decomposition system 120 as discussed in connection with FIG. 1.

As shown, the process begins at operation 610, where a matrix is received. The matrix may be an input matrix whose cells indicate observations of interactions between entities. For example, in some embodiments, one of the entities may be a person, while the other entity is a product. The interaction may be a purchase or return of the product by the person, or a rating or comment of the product by a person. Depending on the embodiment, different types of entities may be used. In some embodiments, the interaction may be between two persons. In some embodiments, the observed interaction may be a person's rating of a movie.

The input matrix is provided to the decomposition system to be decomposed into factor matrices. The process may be used for a variety of different types of matrix decomposition operations, as known by those skilled in the art. For example, in some embodiments, the decomposition process may be a singular value decomposition. In some embodiments, the decomposition process may be a rank factorization of the input matrix. In some embodiments, the decomposition may produce two resulting factor matrices, where the product of the resulting factor matrices has the same dimensions as the input matrix. In some embodiments, the product of the factor matrices may represent a prediction of all interactions in the block, including interactions where there is not observed data. For example, in some embodiments, the first factor matrix may indicate the preferences of different persons for a particular set of features of products, and the second factor matrix may indicate the relevance of the set of features to different products. The two factor matrices may be multiplied to predict all person's preferences for all products.

At operation 620, the input matrix is divided into a grid of blocks. In some embodiments, the grid of blocks may be a two-dimensional grid where blocks are organized into a set of rows and columns. In some embodiments, the blocks are then assigned to respective compute nodes in a cluster, which are used to determine local factor matrices for each block. In some embodiments, these local factor matrices may be multiplied to predict the values within each block. In some embodiments, each node may be responsible for updating the local factor matrices for a single block during the decomposition process. In some embodiments, the division may be performed based on the size of the input matrix, and/or the number of compute nodes in the cluster that are available to perform the distributed decomposition. In some embodiments, division or assigning of the blocks may be configurable via a configuration interface of the decomposition system.

Operations 630, 640, and 650 comprise iterative process that repeats until a convergence condition is met. At operation 630, a structure of neighboring blocks is selected. This operation may be performed by, for example, the block structure selection module 130 of FIG. 1. As discussed, the neighboring blocks may be assigned to a group of corresponding compute nodes in the cluster. In some embodiments, the selected block structure may include a set of contiguous blocks in the grid. In some embodiments, the structure may be permitted to wrap around the edge of the grid, so that two blocks on opposite edges of the grid may be included in a single block structure. In some embodiments, the process may employ different types of structures over different iterations. For example, different structures may have different number of blocks or have different shapes. In some embodiments, the structure may include three neighboring blocks, including a pivot block, an adjacent block in the same row as the pivot block, and another adjacent block in the same column as the pivot block. In some embodiments, the process may employ an "upper" structure and a "lower" structure based on the pivot block, as shown in FIGS. 2A and 2B.

In some embodiments, during each iteration of the iterative process, multiple structures may be selected to update their respective local factor matrices, which may be performed in parallel. In some embodiments, these structures may be selected so that there is no overlap between the selected structures of a single iteration. In some embodiments, the selection may be performed in a pseudorandom fashion. In some embodiments, the selection may normalize the selection or update frequency of all blocks in the grid based on their respective locations. For example, in some embodiments, a block on the edge or corner of the grid may be selected less often due to the size and shape of the structures. In some embodiments, the selection algorithm may be weighed with per-block coefficients so that the edge and corner blocks are selected more frequently, to account for their location in the grid. In some embodiments, the selection may be performed using a peer-to-peer protocol among the compute nodes. In some embodiments, the selection may be performed by a controller node in the cluster, or a separate node outside of the cluster. In some embodiments, the selection may be predetermined via a structure selection schedule.

At operation 640, the local factor matrices for the blocks in a structure are updated via the group of compute nodes. As discussed, in some embodiments, each compute node may be responsible for the updating of the local factor matrices of a single block. In some embodiments, the update may progressive reduce the prediction error for the block assigned to the node. In some embodiments, during the update, the compute nodes in the group may gossip, or communicate, to share the state of their local factor matrices. The compute nodes may coordinate their updating so as to reduce the divergence of their respective factor matrices. As may be understood, because the decomposition process is localized to each block, the local factor matrices will be different for the neighboring blocks. However, by allowing the neighboring blocks in a structure to communicate, the local factor matrices of each block may be kept in relative agreement throughout the grid of blocks. In some embodiments, the gossip may be implemented as a simple exchange of the current local factor matrix values among all nodes in the structure group prior to the update, and then performing the update based on the exchanged values. In some embodiments, at each iteration, the exchange of local factor matrix information may be limited to just the structure group. Thus, the sharing of information about the decomposition process is limited to a small group of nodes, which minimizes security and privacy risks. In addition, throughout the distributed decomposition process, the decomposition results are not sent to a central node or server. All of the communication occurs on between peers in block structure groups.

At operation 650, a determination is made whether convergence is achieved for the local factor matrices of all blocks in the grid. As discussed above, as the selection of block structure(s) and updating of local factor matrices are repeated, eventually, the values of the local factor matrices may hone in on a narrow range of values, so that further iterations no longer change the values of the local matrices. This convergence condition may be detected by, for example, monitoring the change that results from each update step. When the changes for all blocks (or some percentage of the blocks) fall below a threshold, for some number of iterations, the convergence condition may be deemed to have been achieved, and the iterative process may be stopped. In that event, the process may proceed to operation 660. If not, the process may repeat to a next iteration of the iterative process, as shown.

At operation 660, the local factor matrices of the blocks in the matrix may be combined to produce the global factor matrices for the matrix. Operation 660 may be performed by for example the global decomposition generator 140 as discussed in connection with FIG. 1. As discussed, the global factor matrices may be multiplied to make predictions about all interactions in the input matrix. Depending on the type of decomposition, the local factor matrices for each block in the grid may be combined and/or average in different ways to obtain the set of global factor matrices of the matrix. In some embodiments, the resulting global factor matrices are generated on an ad-hoc basis, and are not persistently stored, so as to reduce any security risks associated with the storing of such data.

At operation 670, a prediction of a particular interaction in the matrix is generated based on the global factor matrices. For example, in some embodiments, the prediction may be the likelihood that a person will purchase a particular product. In some embodiments, the prediction may be made by multiplying the global factor matrices to generate a completed matrix, and then looking up the appropriate entry in the completed matrix for the person and the particular product. In some embodiments, the completed matrix may be used to select one or more products for a person to make a product recommendation to the person.

Figure 7:
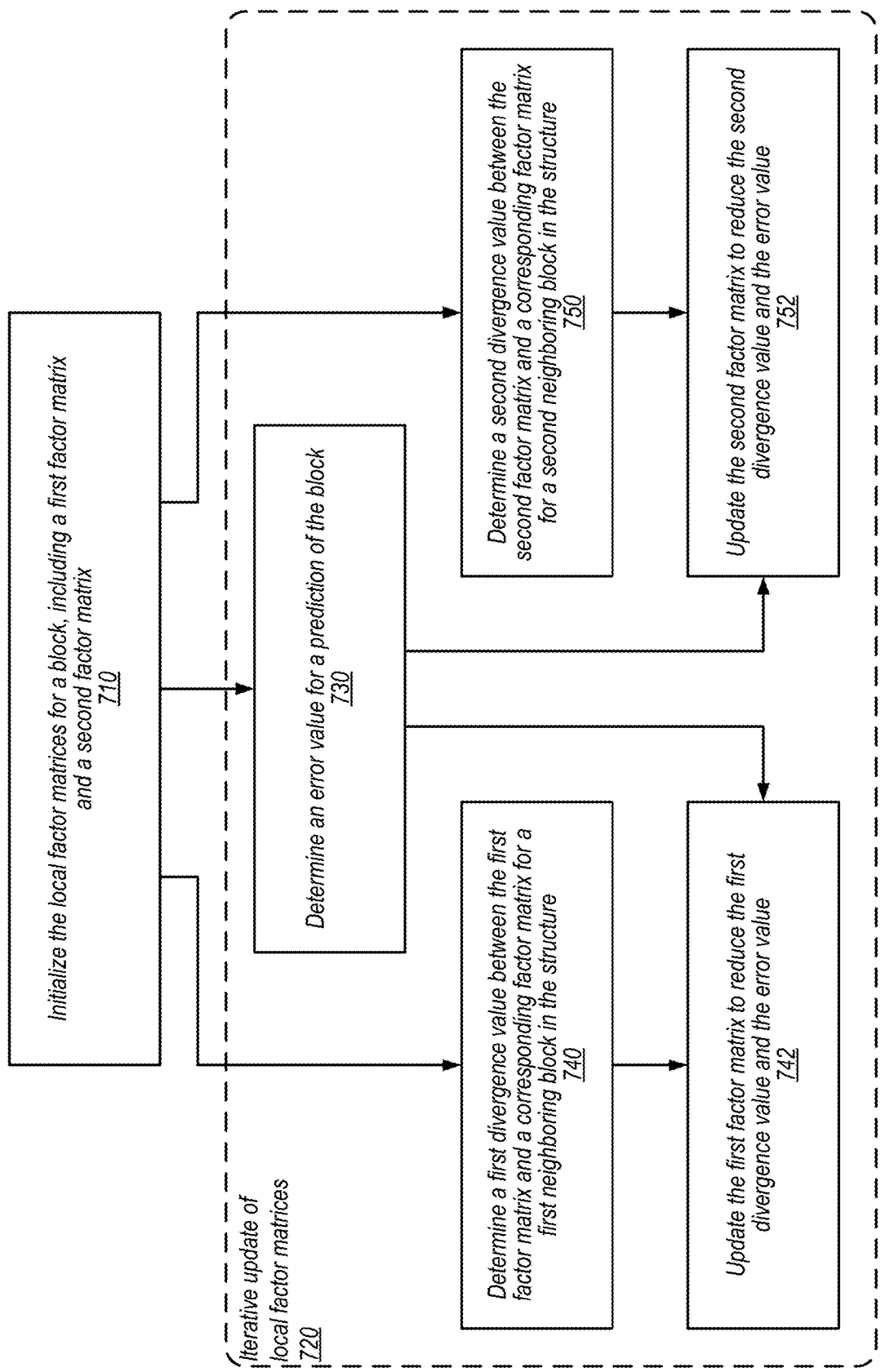
FIG. 7 is a flow chart diagram illustrating a process of updating a set of local decomposed matrices for a block during a distributed matrix decomposition, according to some embodiments.

FIG. 7 is a flow chart diagram illustrating a process of updating a set of local decomposed matrices for a block during a distributed matrix decomposition, according to some embodiments. The process shown may be performed by for example one of the nodes 122, as discussed in connection with FIG. 1. As shown, in some embodiments, the update may be divided into two phases. The first phase may include an initialization operation 710, as shown, which may occur outside of the iterative process. The second phase may include the iterative updating of the local factor matrices 720 which were initialized by operation 710.

At operation 710, the local factor matrices for a block is initialized. In some embodiments, the local factor matrices may include a first factor matrix and a second factor matrix. In some embodiments, the two factor matrices may be two low-rank matrices of rank r that is less than the dimensions of the input matrix. In some embodiments, the product of the two factor matrices results in a matrix that has the same dimensions as the input matrix. In some embodiments, the initialization may simply initialize the local factor matrices with random or pseudorandom values, and rely on the iterative updating process to find the ultimate values. In some embodiments, the initialization may actually perform a local decomposition process on the block assigned to the node. In some embodiments, whether the local decomposition process is performed may be determined based on the sparsity of the block.

At operation 730, an error value of the prediction of the block is determined. Thus, in some embodiments, the current first and second factor matrices of the block may be multiplied and compared to the actual values in the block. In some embodiments, the error value may be the square of the Frobenius norm of the difference between the product and the actual block. In some embodiments, the updating process may comprise a stochastic gradient descent (SGD) process, where the error value is the result of a cost function employed by the SGD process, whose gradient is used to update local factor matrices for the next iteration.

At operation 740, a first divergence value between the first factor matrix and a corresponding factor matrix for a first neighboring block in the structure is determined. Thus, for example, the divergence value between a local U matrix and the local U matrix of a neighboring block may be computed. In some embodiments, the divergence value may be the square of the Frobenius norm of the difference between the two local U matrices. In some embodiments, the first divergence value may be computed as the result of a second cost function employed by the SGD process, whose gradient is used to update the first local factor matrix.

At operation 742, the first factor matrix is updated to reduce the first divergence value and the error value. As discussed, in some embodiments, the process may be a SGD process, and the first local factor matrix may be updated based on the gradient of the two cost functions. In other words, the first local factor matrix is updated iteratively, to more accurately reproduce the values in the block, and at the same time to stay in relative agreement with the findings of its neighboring block(s). In some embodiments, the step size of the update process may be tuned via a step size tuning parameter, as discussed above.

At operation 750, a second divergence value between the second factor matrix and a corresponding factor matrix for a second neighboring block in the structure is determined. Thus, for example, the divergence value between a local W matrix and the local W matrix of a neighboring block may be computed. In some embodiments, the divergence value may be the square of the Frobenius norm of the difference between the two local W matrices. In some embodiments, the second divergence value may be computed as the result of a third cost function employed by the SGD process, whose gradient is used to update the second local factor matrix.

At operation 752, the second factor matrix is updated to reduce the second divergence value and the error value. As discussed, in some embodiments, the process may be a SGD process, and the second local factor matrix may be updated based on the gradient of the cost functions. In other words, the second local factor matrix is updated iteratively, to more accurately reproduce the values in the block, and at the same time to stay in relative agreement with the findings of its neighboring block(s). In some embodiments, the step size of the update process may be tuned via a step size tuning parameter, as discussed above. The iterative update 720 is repeated, until the convergence condition for the matrix is met.

Figure 8:
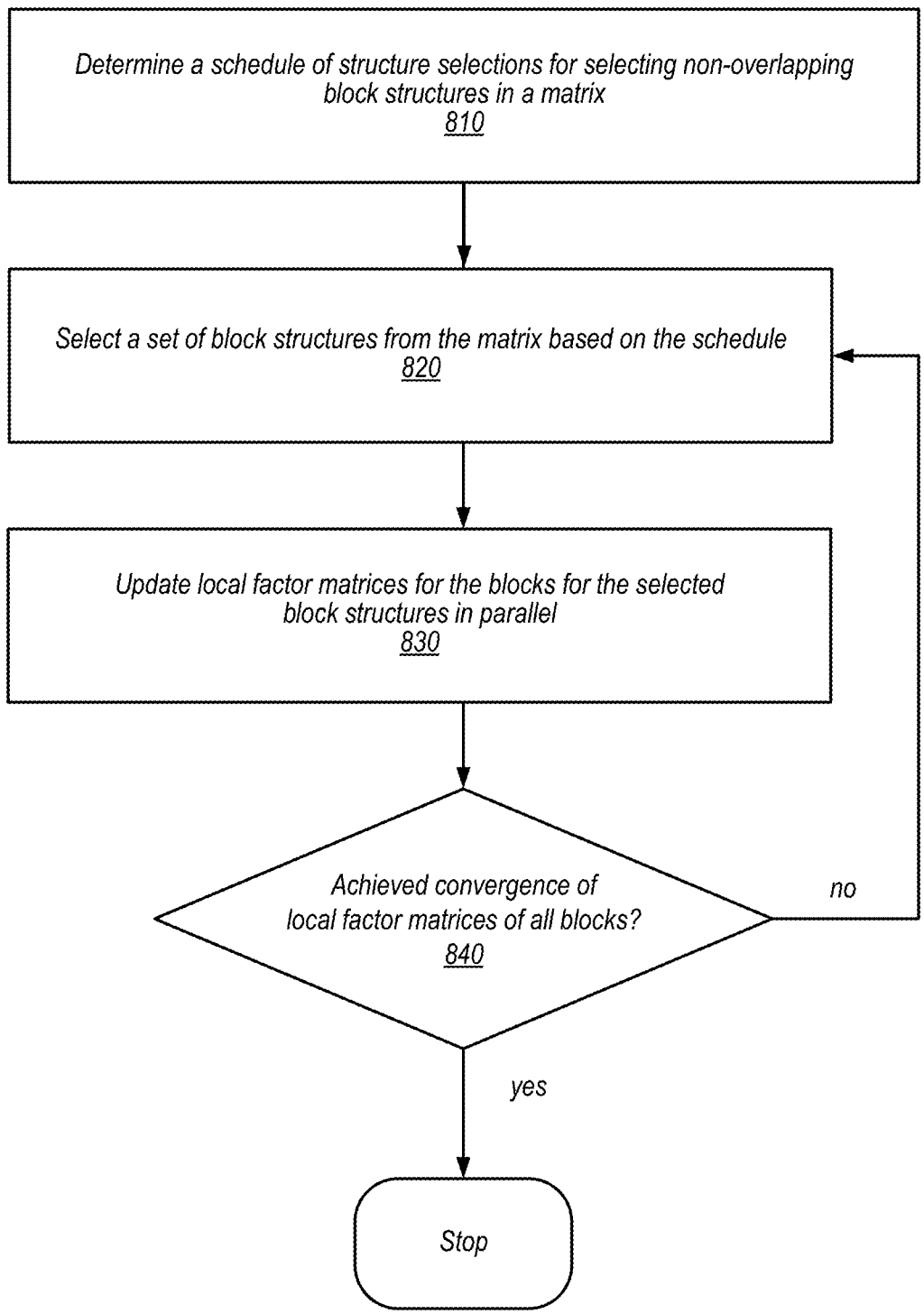
FIG. 8 is a flow chart diagram illustrating a process of selecting a set of block structures using according to a schedule during a distributed matrix decomposition, according to some embodiments.

FIG. 8 is a flow chart diagram illustrating a process of selecting a set of block structures using according to a schedule during a distributed matrix decomposition, according to some embodiments. Portions of the process of FIG. 8 may be performed by, for example, the block structure selection module 130 of FIG. 1

The process begins at operation 810, where a schedule of structure selections is determined. The schedule may be used to select non-overlapping block structures in a matrix, to be used during a distributed matrix decomposition process. In some embodiments, the schedule may be made purely on the architecture of the compute nodes in the decomposition cluster (e.g., size, capacities of the nodes, etc.). In some embodiments, the schedule may be determined based on the input matrix. For example, in some embodiments, depending on the size and sparsity or value distribution of the input matrix, a scheduler may select a block size, a set of block structure sizes and shapes, and finally, the selection of structures to be used on the matrix for each decomposition iteration. In some embodiments, some of the decisions in the scheduling process may be made in a pseudorandom manner. In some embodiments, the schedule may be readjusted during the iterative process, so that for example, the process may focus on certain areas of the matrix where convergence is difficult to achieve.

As shown, operations 820, 830, and 840 comprises an iterative process, which is similar to the iterative process discussed in connection with FIG. 7. In this example, operation 820 is used to select a set of block structures from the matrix based on the schedule. Thus, operation 820 is performed with each iteration, to divide the matrix up into block structures to be updated together.

As shown, at operation 830, the local factor matrices for the blocks in the selected structures are updated, in parallel. Thus, in some embodiments, the schedule may select many block structures from the matrix, so that the computer nodes may perform localized work on the matrix, to decompose the matrix in parallel. In some embodiments, such localized decomposition may be much less costly than a decomposition operation performed on the full matrix. The details of the update operation 830 may be performed in a similar fashion as discussed in connection with FIGS. 6 and 7.

At operation 840, a determination is made whether convergence for the local factor matrices for all blocks in the matrix. In some embodiments, each block or compute node may maintain a convergence flag, which may indicate whether the results of that block are currently believed to be in convergence. When all flags of all blocks (or some percentage of the blocks) are set to convergence, the convergence condition may be deemed to be met. In some embodiments, the iterative process may cease to update certain blocks for updating after the convergence flag is set. In some embodiments, the convergence flag may be unset based on changes in the results of its neighboring blocks. In some embodiments, operation 840 may be performed in similar fashion as operation 650 of FIG. 6. Once convergence is achieved, the iterative process may stop. In some embodiments, the process may then proceed to combine the results for each of the blocks, as discussed in connection with operation 660 of FIG. 6.

Figure 9:
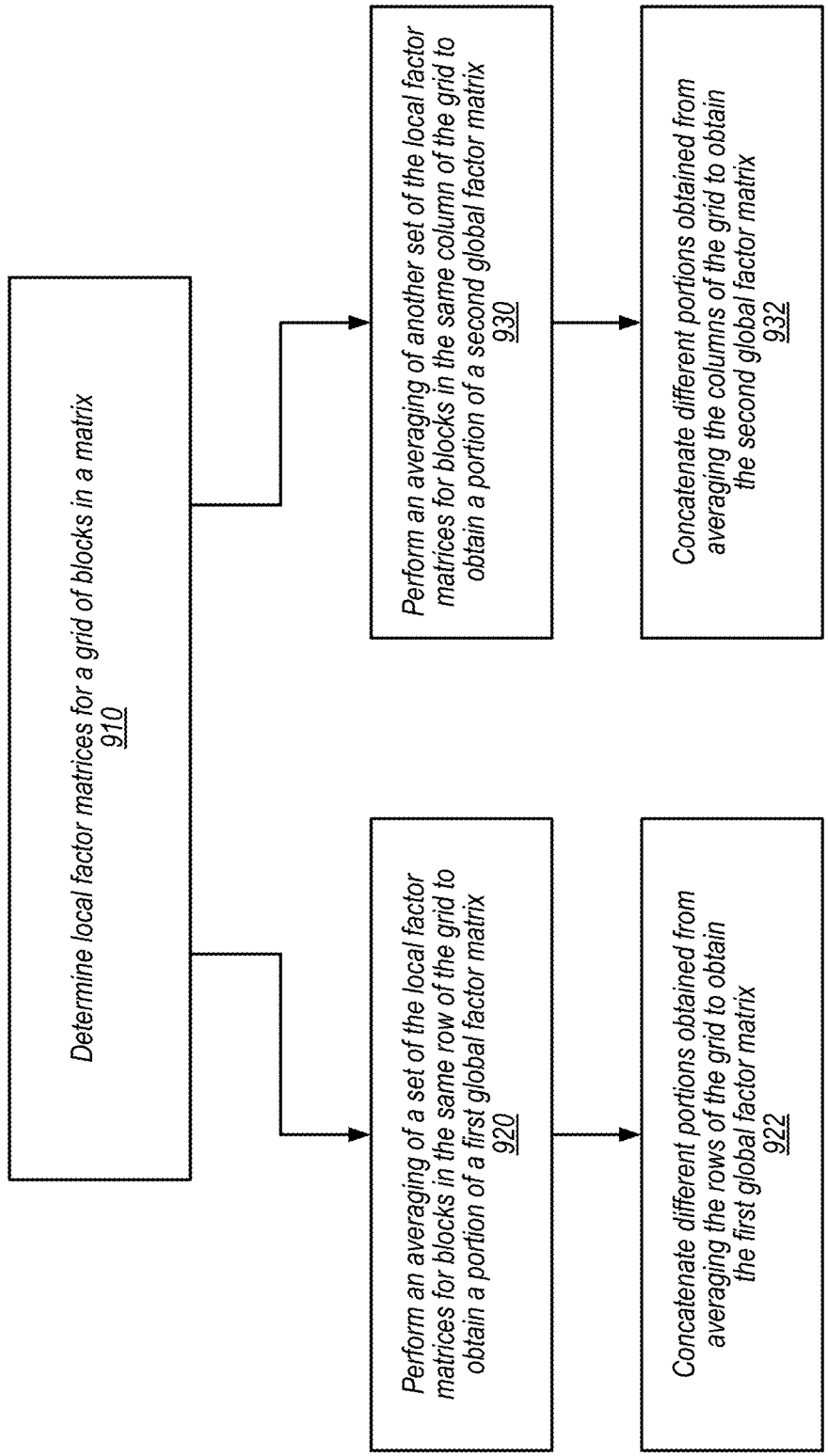
FIG. 9 is a flow chart diagram illustrating a process of combining local decomposed matrices to produce a set of global factor matrices, according to some embodiments.

FIG. 9 is a flow chart diagram illustrating a process of combining local decomposed matrices to produce a set of global factor matrices, according to some embodiments. The process of FIG. 9 may be performed for example by the global decomposition generator 140 as discussed in connection with FIG. 1.

At operation 910, the local factor matrices is determined for a grid of blocks in a matrix. This operation may be performed in similar fashion as discussed in for example FIG. 6.

At operation 920, an averaging of a set of local factor matrices for blocks in the same row of the gird is performed. The result of the averaging may represent a portion of a first global factor matrix for the overall matrix. In some embodiments, the averaging may be performed for one of the two local factor matrices for each block (e.g., the local Us of each block). In some embodiments, the values in the local factor matrices may be averaged as an arithmetic or geometric mean. In some embodiments, the averaging may be weighted averaging. For example, blocks that are very sparse may be assigned a lower weight as compared to blocks that are denser in terms of values.

At operation 922, the different portions obtained from the averaging of the rows of the grid are concatenated, in order to generate the first global factor matrix. As discussed, in some embodiments, the global factor matrix may not be persistently stored in any one location so as to reduce the security risk of storing such data. In some embodiments, only a sub-portion of the global factor matrix is needed to make a particular prediction. In such embodiments, only the sub-portion of the global factor matrix may be constructed.

Operations 930 and 932 are performed in largely similar fashion to operations 920 and 922. However, for operations 930 and 932, the averaging occurs for the other local factor matrix, and along the columns of the grid. As may be understood, at the end of operations 930 and 932, the second global factor matrix for the input matrix may be constructed. As discussed, in some embodiments, the second global factor matrix may not be persistently stored in a single location. In some cases, only a sub-portion of the second global factor matrix may be constructed.

Figure 10:
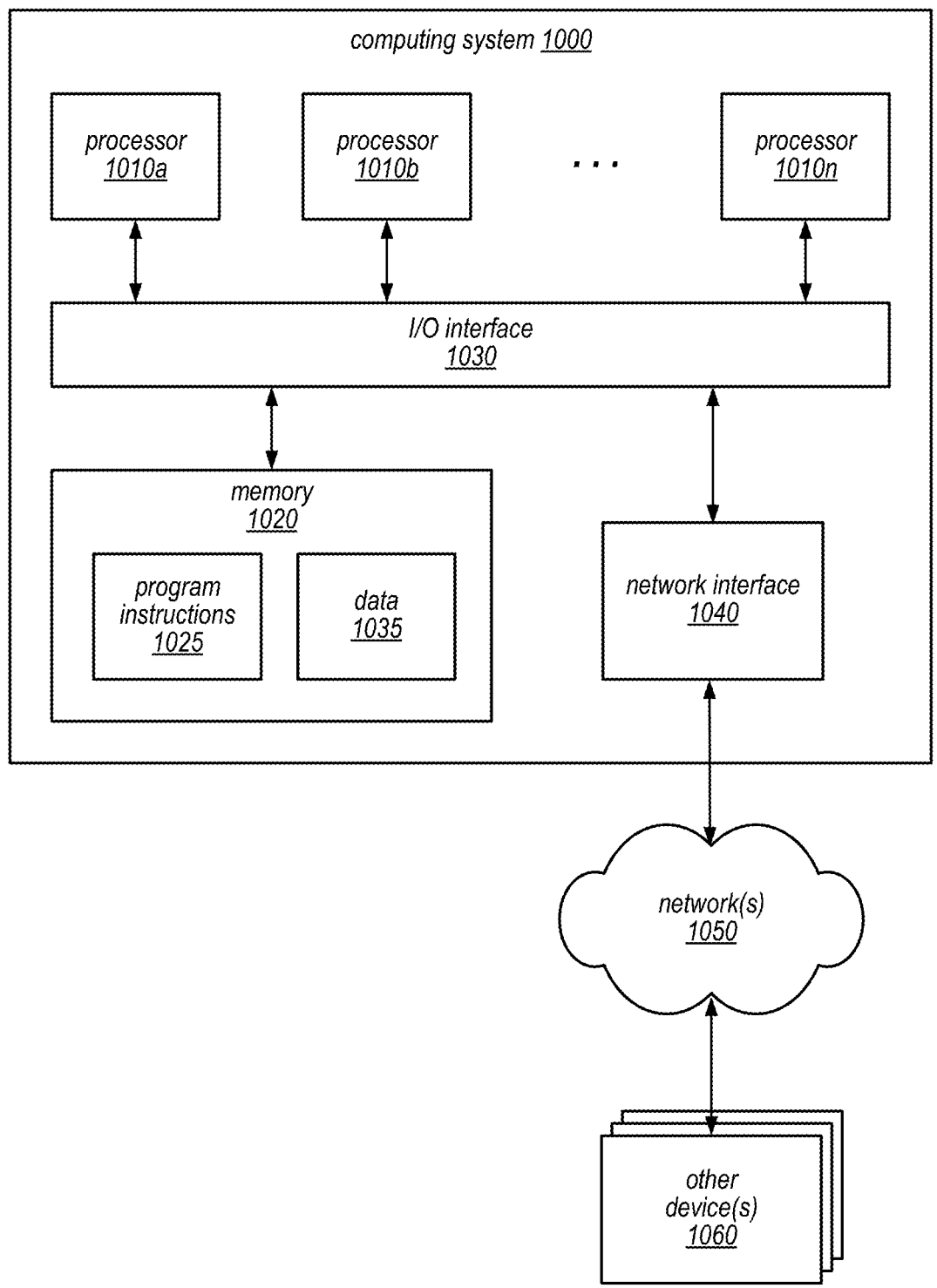
FIG. 10 is a block diagram illustrating an example computer system that can be used to implement one or more portions of a distributed matrix decomposition system using gossip, according to some embodiments.

FIG. 10 is a block diagram illustrating an example computer system that can be used to implement one or more portions of a distributed matrix decomposition system using gossip, according to some embodiments. As shown, computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more hardware processors with associated memory, configured to:
receive a matrix, wherein individual cells of the matrix represent observed interactions between entities;
divide the matrix into a grid of blocks and assign individual blocks to be decomposed by respective compute nodes in a cluster;
initialize a first local factor matrix and a second local factor matrix for individual blocks, wherein a product of the first and the second local factor matrices represents a prediction of all interactions in the block;
perform an iterative process to:
select a structure of neighboring blocks in the grid assigned to a group of compute nodes in the cluster;
update, via the compute nodes in the group, the local factor matrices for the neighboring blocks in the structure, wherein the update reduces respective predictions errors for the neighboring blocks, and the compute nodes in the group gossip with each other to reduce divergence among the local factor matrices for their respective blocks; and
repeat the selection and updating until the local factor matrices of all blocks in the matrix converge;
combine the local factor matrices of the blocks in the matrix to generate a first global factor matrix and a second global factor matrix, wherein a product of the first and the second global factor matrices represents a prediction of all interactions in the matrix; and
generate a prediction of a particular entity-to-entity interaction in the matrix based at least in part on the first and second global factor matrices.

2. The system of claim 1, wherein to update the local factor matrices, a compute node in the group is configured to:
determine an error value for a prediction of its block;
determine a first divergence value between the first local factor matrix and a corresponding first local factor matrix for a first neighboring block in the structure;
determine a second divergence value between the second local factor matrix and a corresponding second local factor matrix for a second neighboring block in the structure;
update the first local factor matrix to reduce the first divergence value and the error value; and
update the second local factor matrix to reduce the second divergence value and the error value.

3. The system of claim 2, wherein to update the local factor matrices, the compute node performs a stochastic gradient descent operation, wherein the error value, the first divergence value, and the second divergence value are computed via different cost functions, and the updating of the first and second factor matrices are based at least in part on gradients of the cost functions.

4. The system of claim 1, wherein for a given iteration of the iterative process, the system is configured to:
select a plurality of block structures in the matrix in a pseudorandom fashion, wherein the selected block structures do not overlap, and wherein the selection normalizes a selection frequency of blocks in the matrix based at least in part on their respective locations; and
update local factor matrices for blocks in all selected block structures in parallel, wherein local factor matrices are shared only among compute nodes assigned to blocks in common block structures.

5. The system of claim 1, wherein the cells of the matrix represent observed user interactions with products, and the system is configured to generate a product recommendation based at least in part on the prediction generated from the first and second global factor matrices.

6. A method comprising:
receiving a matrix whose cells indicate observations of interactions between entities;
dividing the matrix into a grid of blocks and assigning individual blocks to be decomposed by respective compute nodes of a cluster into a first local factor matrix and a second local factor matrix whose product represents a prediction of interactions in the individual blocks;
performing an iterative process, comprising:
selecting a structure of neighboring blocks in the grid assigned to a group of compute nodes;
updating, via the compute nodes in the group, local factor matrices for respective blocks in the structure, wherein the update reduces predictions errors for the respective blocks, and the compute nodes in the group gossip with each other to reduce divergence among the local factor matrices for the respective blocks; and
repeating the selection and updating until local factor matrices of all blocks in the matrix converge;
combining the local factor matrices of the blocks in the matrix to generate a first global factor matrix and a second global factor matrix, wherein a product of the first and the second global factor matrices represents a prediction of all interactions in the matrix; and
generating a prediction of a particular interaction in the matrix based at least in part on the first and second global factor matrices.

7. The method of claim 6, updating the local factor matrices for respective blocks in the structure comprises performing, by a compute node in the group:
determining an error value for a prediction of its block;
determining a first divergence value between the first local factor matrix and a corresponding first local factor matrix for a first neighboring block in the structure;
determining a second divergence value between the second local factor matrix and a corresponding second local factor matrix for a second neighboring block in the structure;
updating the first local factor matrix to reduce the first divergence value and the error value; and
updating the second local factor matrix to reduce the second divergence value and the error value.

8. The method of claim 7, wherein the error value, the first divergence value, and the second divergence value are determined based at least in part on different cost functions of a stochastic gradient descent operation, and the updating of the first and second factor matrices are based at least in part on gradients of the cost functions.

9. The method of claim 6, wherein dividing the matrix into the grid of blocks comprises dividing the matrix into a number of block based at least in part on a number of available compute nodes in the cluster.

10. The method of claim 6, wherein selecting the structure comprises selecting a plurality of blocks structures in the matrix in a pseudorandom fashion for different iteration of the iterative process, wherein the selected block structures do not overlap.

11. The method of claim 10, wherein the selection comprises normalizing a selection frequency of blocks in the matrix based at least in part on their respective locations.

12. The method of claim 10, wherein local factor matrices are shared only among compute nodes assigned to blocks in common block structures.

13. The method of claim 10, wherein selecting a plurality of block structures in the matrix comprises selecting block structures of different shapes.

14. The method of claim 6, wherein selecting the structure comprises selecting a plurality of block structures in the matrix based at least in part on a predetermined schedule of structure selections, for different iteration of the iterative process.

15. The method of claim 6, wherein the structure comprises a pivot block, a first block adjacent to the pivot block in a same row as the pivot block, and a second block adjacent to the pivot block in a same column as the pivot block.

16. The method of claim 6, wherein the matrix indicates observations of a plurality of persons with respect to a plurality of products, and further comprising:
generating a product recommendation for a particular person based at least in part on the prediction generated from the first and second global factor matrices.

17. A non-transitory computer-accessible storage medium storing program instructions that when executed on one or more processors, cause the one or more processors to:
receive a matrix whose cells indicate observations of interactions between entities;
divide the matrix into a grid of blocks and assign individual blocks to be decomposed by respective compute nodes of a cluster into a first local factor matrix and a second local factor matrix whose product represents a prediction of interactions in the individual blocks;
perform an iterative process to:
select a structure of neighboring blocks in the grid assigned to a group of compute nodes;
cause the compute nodes in the group to update local factor matrices for respective blocks in the structure, wherein the update reduces predictions errors for the respective blocks, and the compute nodes in the group gossip with each other to reduce divergence among the local factor matrices for the respective blocks; and
repeat the selection and updating until local factor matrices of all blocks in the matrix converge;
combine the local factor matrices of the blocks in the matrix to generate a first global factor matrix and a second global factor matrix, wherein a product of the first and the second global factor matrices represents a prediction of all interactions in the matrix; and
generate a prediction of a particular interaction in the matrix based at least in part on the first and second global factor matrices.

18. The non-transitory computer-accessible storage medium of claim 17, wherein to select the structure, the program instructions when executed on the one or more processors cause the one or more processors to:
select a plurality of block structures in the matrix in a pseudorandom fashion, wherein the selected block structures do not overlap.

19. The non-transitory computer-accessible storage medium of claim 17, wherein to select the structure, the program instructions when executed on the one or more processors cause the one or more processors to:
select a plurality of block structures in the matrix based at least in part on a predetermined schedule of structure selections.

20. The non-transitory computer-accessible storage medium of claim 17, wherein to combine the local factor matrices to produce the global factor matrices for the matrix, the system is configured to:
perform an averaging of a set of local factor matrices for blocks in a same row of the grid to obtain a portion of a first global factor matrix of the matrix;
concatenate respective portions obtained for different rows of the grid to obtain the first global factor matrix;
perform another averaging of another set of local factor matrices for blocks in a same column of the grid to obtain a portion of a second global factor matrix of the matrix; and
concatenate respective portions obtained for different columns of the grid to obtain the second global factor matrix.

* * * * *